3,380,930
OLEFIN POLYMERIZATION PROCESS AND
CATALYST FOR USE THEREIN
Donald B. Miller, Ponca City, Okla., assignor to Continental Oil Company, Ponca City, Okla., a corporation of Delaware
No Drawing. Filed Oct. 21, 1963, Ser. No. 317,825
3 Claims. (Cl. 252—429)

This invention relates to a process for polymerizing certain olefinic materials, and to a new catalyst composition employed in such polymerization process. More particularly, the present invention relates to the polymerization of ethylenically unsaturated monomers to produce stereoregulated polymers, that is, polymers having a high isotactic content. In one of its preferred aspects, the invention relates to an improved method for polymerizing propene.

Polymerization processes by which ethylenically unsaturated monomers, such as ethylene, propene and styrene, are polymerized to form valuable polymers, such as polyethylene, polypropylene and polystyrene, are now well known and widely used. Efforts are, however, constantly going forward in the chemical industry to improve polymerization processes with respect to the yields obtained, the properties of the polymer product produced and the cost of materials used in the process. One of the most important considerations in any polymerization process which is catalytically promoted are the cost, properties and effectiveness of the catalyst which is used. In the polymerization of ethylenically unsaturated monomers, and particularly, of propylene, coordination-type catalysts of the general type discovered and developed by G. Natta and Karl Ziegler, commonly referred to as Ziegler-Natta catalysts, are widely used.

In its most basic form, the Ziegler-Natta catalyst system includes an organo-metallic compound (usually an alkyl-aluminum compound) and a transition metal halide (usually one of the titanium halides). Many modifications and improvements have been made with respect to the basic constitution of the Ziegler-Natta catalyst system, and many of these improved catalyst compositons have been effective in the attainment of the specific end for which they were developed. Thus, some of the Ziegler-Natta catalyst in use are effective to give a relatively high yield of polymer and/or are also effective to vary the molecular weight of the polymer produced. Some are of less volatility and are preferred for this reason. By modifying the catalyst system in other respects, it is known that other process variables, such as reaction time, required temperature or pressure and/or the properties of the polymer product, can be varied and controlled. Variation in the density of the polymer product can, for example, be controlled in many instances by varying the type of catalyst used.

In the case of the polymerization of some ethylenically unsaturated monomers, and particularly in the case of the polymerization of propylene, the presently existing commercial usage of the polymer in many instances requires that the polymer be characterized by a high degree of crystallinity or isotaxy. This latter property (isotaxy) of the polymer results from the stereoregularity of the repeating units of the polymer chain and is manifested by a more highly crystalline or less amorphous character in the polymer. Crystallinity of the polymer product can also be improved by reducing the extent of branching in the polymer chain. When the basic Ziegler-Natta catalyst is utilized for polymerizing propylene, the degree of isotaxy which characterizes the polypropylene product as measured by the accepted criterion of insolubility in boiling heptane, does not generally exceed about 65 percent. This low degree of isotaxy renders the polypropylene so produced unsuitable for the majority of present commercial requirements so that production of polypropylene employing the basic, two-component catalyst system has been necessarily limited. Other attempts to improve the isotaxy of polypropylene by incorporating various modifiers in the basic Ziegler-Natta catalyst system have resulted in some improvement in the isotaxy of the polymer produced, but have frequently resulted in a reduction in the rate of polymerization or the yield which is so severe as to render the employment of such catalyst systems of questionable feasibility.

It is an important object of the present invention to provide an improved procedure for polymerizing ethylenically unsaturated monomers, and to provide an improved catalyst for use in such process.

Another object of this invention is to provide an improved polymerization catalyst which is capable of forming polymers having a very high isotactic content.

An additional object of the present invention is to provide an improved catalyst system which is highly effective and relatively inexpensive when utilized in the process of the invention for polymerizing certain olefinic materials.

A more specific object of the invention in one of its forms of practice is to provide an improved process for polymerizing polypropylene.

Another object of the invention is to provide a catalyst which may be employed in the process of polymerizing propylene so as to yield polypropylene having a higher degree of isotaxy than has previously been obtainable utilizing many of the catalyst heretofore proposed for the polymerization of propylene.

In addition to the foregoing described objects of the invention, additional objects and advantageous features of the invention will become apparent from the following detailed description of the invention.

Broadly, the catalyst composition which is employed in the process of the present invention comprises a titanium halide compound, an organo-aluminum compound and a sulfur containing material selected from the group consisting of elemental sulfur and compounds having a sulfur atom bonded directly to a halogen atom. These sulfur-halogen compounds may be characterized as being of three types, the characterizatoin being based upon the inclusion in the compounds of one or more of the following three atomic groups.

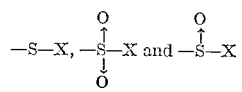

where X is halogen. In one aspect, the invention is directed to the novel catalyst composition constituted by the three materials described, and to the method of preparing such composition, and in another aspect, the invention relates to the use of the novel catalyst composition in the polymerization of ethylenically unsaturated monomers.

The organo-aluminum compounds which are useful in the invention are represented by the formula

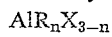

wherein R is hydrocarbon, X is selected from hydrogen and halogens selected from the group consisting of chlorine, bromine and iodine, and $n$ varies from 2 to 3. Of these materials, those in which the hydrocarbon substituents of the aluminum are alkyl groups are preferred. These preferred compounds within the scope of the structural formula above include, but are not limited to, triethylaluminum, tripropylaluminum, triisobutylaluminum, triamylaluminum, diethylaluminum hydride, dipropylaluminum hydride, diisobutylaluminum chloride, diamylaluminum hydride, diethylaluminum bromide and dipropylaluminum iodide. In addition to the various preferred types of alkyl substituted aluminums mentioned, it will be apparent that the formula set forth above can include other aluminum compounds such as the aryl halides and hydrides as well as aluminum compounds fully substituted with other hydrocarbon groups. The hydrocarbon radicals in the aluminum compounds can be either like or unlike, and include the aromatic and saturated aliphatic radicals, as, for example, alkyl, aryl, cycloalkyl, alkaryl, and aralkyl. The hydrocarbon groups, alkyl or other types, are preferably limited to those containing from 1 to about 12 carbon atoms, and are most preferably the lower alkyl groups containing from about 2 to about 8 carbon atoms.

The second component of the catalyst system of this invention is the titanium compound which is identified by the formula $TiX_n$, wherein X is selected from chlorine, bromine and iodine, and $n$ varies from 2 to 4. The most desirable single transition metal halide for use in the catalyst system of the invention is titanium trichloride; however, other titanium compounds defined by the formula set forth above can also be very effectively employed in the catalyst composition.

The sulfur containing materials which may be employed as the third catalyst component, or novel "modifiers" of the basic Ziegler-Natta catalyst system in accordance with the present invention, include elemental sulfur and compounds containing a sulfur atom bonded directly to a halogen atom. It has been surprisingly determined that these materials function in combination with the organo-metallic compound and transition metal halide constituting the basic components of the Ziegler-Natta catalyst system to substantially increase the isotaxy of polymers prepared by the use thereof. The sulfur-halogen compounds which are useful can be either organic or inorganic, and, as hereinbefore indicated, include one or more of the following atomic groupings

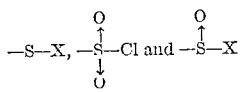

where X is a halogen atom. Examples of compounds which include a sulfur atom bonded to a halogen atom include, but are not limited to, p-toluenesulfonyl chloride, trichloromethanesulfonyl chloride, trichloromethanesulfonyl bromide, sulfuryl chloride, thionyl chloride, sulfur monochloride, sulfur monobromide, sulfur dichloride, sulfur tetrachloride, sulfur tetrabromide, sulfur chloroiodide, sulfur hexafluoride, sulfuryl fluoride, thionyl bromide, thionyl fluoride, analine sulfonyl chloride, benzene disulfonyl chloride, benzenesulfonyl chloride, bromobenzenesulfonyl bromide, o-diazobenzenesulfonyl chloride, trichloromethylsulfenyl chloride, 2-4 dinitrophenylsulphenyl chloride, and ethyl chlorosulfite.

As the functional group formed by the bonded halogen and sulfur atoms is mainly responsible for the effect of the modifier in increasing isotaxy of the polymer product, the specific nature of the substituents, if any, of the sulfur atom is not of great importance. When the sulfur-halogen compounds are organic in nature, the substituents of the sulfur atom may be aryl, alkyl, aralkyl, alkaryl or substituted organic radicals including these groups. When organic sulfur-halogen containing compounds are employed, it is preferable that these compounds contain no more than about 20 carbon atoms and, more desirably, not more than about 10 carbon atoms. It is further contemplated, as suggested by the above list of exemplary compounds, that the modifiers used in the catalyst system of the invention may include a plurality of the sulfur-halogen linkages.

A wide variety of combinations of the several components of the catalyst system of the invention are, of course, possible and space permits identification of only a relatively small portion of the total number of catalyst systems which can be employed. The following examples are presented merely as specific exemplifications of the catalyst systems which are effective in carrying out the invention and are by no means intended to constitute an all-inclusive statement of the operative catalyst systems meeting the broad definition hereinbefore set forth. Triethylaluminum, titanium trichloride and p-toluenesulfonyl chloride; diethylaluminum hydride, titanium dichloride and trichloromethanesulfonyl chloride; dipropylaluminum chloride, titanium tetrachloride and sulfuryl chloride; triisobutylaluminum, titanium tribromide and thionyl chloride; diphenylaluminum hydride, titanium triiodide and sulfur monochloride; triisopropylaluminum, titanium trichloride and sulfur monobromide; dihexylaluminum hydride, titanium tetrachloride and sulfur dichloride; triethylaluminum, titanium tribromide and sulfur tetrabromide; diethylaluminum hydride, titanium tribromide and sulfur chloroiodide; dipropylaluminum chloride, titanium tetrabromide and sulfur hexafluoride; dinonylaluminum iodide, titanium trichloride and sulfuryl chloride; didodecylaluminum bromide, titanium tribromide and sulfuryl fluoride; tridecylaluminum, titanium tetrachloride and thionyl bromide; tricyclohexylaluminum, titanium dibromide and thionyl fluoride; tribenzylaluminum, titanium tetraiodide and analinesulfonyl chloride; dimethylcyclopentylaluminum, titanium diiodide and benzene disulfonyl chloride; trieicosylaluminum, titanium trichloride and benzenesulfonyl chloride; dicyclobutylaluminum hydride titanium tribromide and sulfur; triphenylaluminum, titanium triiodide and bromobenzenesulfonyl bromide; trioctadecylaluminum, titanium tetrachloride and o-diazobenzenesulfonyl chloride; tricyclobutylaluminum, titanium tetrabromide and trichloromethylsulfenyl chloride; diisobutylaluminum hydride, titanium dichloride and sulfur; diphenylaluminum chloride, titanium dichloride and 2-4 dinitrophenylsulphenyl chloride; triethylaluminum, titanium tetraiodide and ethyl chlorosulfite.

The preferred catalyst systems for use in practicing the process of the invention, and particularly, for use in improving the stereoregularity of propylene, styrene, and other monomers susceptible to stereoregulation, are those which include sulfur or the sulfur-halogen containing compounds hereinbefore described when used in combination with triethylaluminum and titanium trichloride. The amount of elemental sulfur or sulfur-halogen compound which is employed in the catalyst system is best related to the amount of the other catalyst components, and particularly, to the amount of the organo-aluminum compound employed.

The amount of the sulfur-halogen compound will vary considerably depending upon the particular modifying compound utilized, the particular components of the basic Ziegler-Natta catalyst which are used in combination with the modifier, and the extent to which modification of the polymer product from that obtained with the basic catalyst is desired. However, the amount of sulfur or sulfur-halogen compound which is used is usually relatively small, and an amount will be chosen which is effective to improve the stereoselectivity of the basic catalyst ingredients, but insufficient to decrease the activity of the catalyst to an undesirable extent. In general, it can be stated that any substantial amount of the sulfur containing material which does not completely deactivate the catalyst or result in an unacceptably low yield of polymer will have some beneficial effect in improving the amount of isotactic polymer which is produced in proportion to the amount of atactic polymer which is yielded.

In most instances, the mole ratio of the sulfur-halogen compound or elemental sulfur to the organo-aluminum compound employed in the catalyst system will vary from about 0.05 to about 5. The optimum range in a given situation may be considerably smaller than this stated broad range. In some instances, the range of operable proportions will be slightly outside the stated range. However, it is a matter of the simplest of tests to determine operable and optimum quantities of any given catalyst system containing the components prescribed by the present invention, and such tests are well within the skill of those familiar with the art to which the invention appertains. With catalyst systems which include trialkylaluminum and titanium trichloride, the mole ratio of sulfur-halogen compound or elemental sulfur to trialkylaluminum which is employed will usually range from about 0.1 to about 2. The upper portion of this range is particularly suitable when elemental sulfur is used as a third component of the catalyst system, while a mole ratio of sulfur-halogen compound to trialkylaluminum of from about 0.15 to about 0.5 will usually be preferable in catalyst systems including these components.

The amount of the titanium halide employed in the catalyst systems can also be defined relative to the aluminum compound, i.e., the mole ratio of the titanium compound to the alkylaluminum compound varies from about 0.15 to about 1 and is preferably from about 0.2 to about 0.5.

Use of the sulfur-halogen compound or elemental sulfur in the catalyst systems of the invention tends to decrease the activity otherwise exhibited by the basic two-component Ziegler-Natta system. As already pointed out, the amount of the modifier which is used in the system must be limited so that this decreased activity does not occur to an extent that is undesirable. All other things being considered, it certainly must be limited so that the catalyst activity is not destroyed. The activity of the catalyst can be noted by the rate at which a particular monomer is polymerized and a comparison of such rate with the rate which prevails where the organo-aluminum compound and titanium halide are utilized without the inclusion in the catalyst system of the sulfur-halogen compound or sulfur modifier. Decreased catalyst activity, which results in a decreased rate of reaction, can be compensated for by a change in several reaction variables, such as by increasing the amount of catalyst, increasing the temperature, or increasing the pressure. Reaction variables, such as pressure, temperature, and time of reaction, will be discussed in greater detail hereinafter.

The monomers which are polymerized through the use of the catalysts of this invention are defined broadly as polymerizable, ethylenically unsaturated hydrocarbon monomers, or differently described, as vinyl hydrocarbons. A preferred class of these compounds is the aliphatic 1-olefins, such as, for example, ethylene, propylene, 1-butene, 1-hexene, 1-octene and the like. Internal olefins and branched chain olefins can also be polymerized, such as 2-pentene and isobutylene. In addition, cyclic olefins, such as cyclopentene and cyclohexene can also be polymerized. The polymerizable ethylenically unsaturated monomers also include the aryl olefins, for example, styrene and the alkyl substituted styrenes. The alkyl substituted ethylenes can also be employed, such as, 2-methyl butene-1, 4-methyl pentene-1 and the like. Polyolefins in which double bonds are in either the conjugated or nonconjugated positions can also be employed. These include, for example, 1,5-hexadiene, 1,4-pentadiene, 1,4-octadiene, isoprene, 2-phenylbutadiene and the like. It is also within the scope of the invention to polymerize mixtures of two or more of any of the monomers of the types previously set forth to produce the corresponding copolymers.

The invention, however, is of particular significance with respect to the polymerization of those monomers which are capable of yielding polymers having an isotactic molecular structure in which the repeating side groups along the carbon chain are of a regular arrangement. This geometry imparts to the isotactic polymer a high degree of crystallinity. Monomers which may be polymerized through the use of the present invention to produce improved yields of isotactic polymer include propylene, butene and styrene.

The catalyst system of the invention is preferably prepared as a dispersion in an inert organic liquid and the polymerization reaction is subsequently carried out in the presence of the inert organic diluent. The organic diluent used is preferably an aliphatic or aromatic hydrocarbon, or mixtures thereof, and may be selected from such compounds as pentane, hexane, heptane, isooctane, cyclohexane, methyl cyclopentane, benzene, toluene and the like. The catalyst components are brought together in the absence of air and moisture in the inert hydrocarbon diluent with the elemental sulfur or sulfur-halogen compound and the organo-aluminum compound being preferably introduced to the hydrocarbon diluent prior to the addition of the titanium halide. After addition of the titanium halide, the monomer or mixture of monomers to be polymerized is then introduced to the polymerization vessel.

The pressure at which the polymerization is carried out is dependent upon the monomer which is to be polymerized and other variables. In general, the reaction pressure is sufficiently high to maintain the inert diluent which is employed in a liquid state under the prevailing reaction conditions. In most instances, the polymerization reaction is suitably carried out at atmospheric pressure or higher. However, the pressure can vary widely from slightly below atmospheric up to several thousand pounds per square inch. While high pressures are not required in order to obtain the reaction, they will have a desirable effect on the reaction rate and, in some instances, on the polymer quality. The choice of whether or not to use an appreciably elevated pressure will be one of economic and practical considerations, taking into account the advantages that can be obtained thereby. In general, however, the pressure employed will range between atmospheric and about 200 p.s.i.g.

In the course of the polymerization reaction, the catalyst and monomer are preferably intimately contacted by agitating the system by suitable stirring or other means. However, in some instances, the polymerization mixture can be allowed to remain quiescent while the polymerization takes place. The polymerization can be effected by a batch method, or by a continuous process, such as, for example, by passing the reaction mixture through an elongated reaction tube which is contacted externally with suitable cooling media to maintain a desired reaction temperature.

Polymerization processes employing the catalyst system of the invention can be carried out over a wide range of temperatures with the particular preferred temperature again being chosen in accordance with the particular monomer to be polymerized, the pressure employed, the particular catalyst used in the system, and other reaction variables. In general, the polymerization reaction is carried out at as low a temperature as is feasible, usually between 0° C. and 150° C. In most instances, the temperature may be maintained within the range of from about 25° C. to about 100° C.

The time required to carry out the polymerization reaction is dependent upon most of the variables which have already been described as effecting the temperature and pressure which are to be employed in the process. Broadly, the reaction time can vary from about as low as a few minutes, for example, two minutes, to as high as 100 hours. Generally, however, in a batch process, the reaction is carried out over a period of from about 4 to about 24 hours.

The polymeric products produced by the process of the invention can be recovered from the total reaction mixture by a wide variety of procedures, most of which are conventional and well understood by those skilled in the art, and which are chosen in accordance with the properties of the particular polymer produced, the presence or absence of solvent at the end of the polymerization run and the like. It is generally desirable to remove as much of the catalyst from the polymer as possible, and this is conveniently done by contacting the total reaction mixture, or the polymer after separation from the solvent, etc., with methanolic hydrochloric acid, with an aliphatic alcohol such as methanol, isobutanol, secondary butanol or by various other procedures. If the polymer is insoluble in the solvent, it can be separated therefrom by filtration, centrifuging or other suitable physical techniques. If the polymer is soluble in the solvent, it is advantageously precipitated by admixture of the solution with a nonsolvent, such nonsolvent usually being an organic liquid miscible with the solvent but in which the polymer to be recovered is not readily soluble. Of course, any solvent present can also be separated from the polymer by evaporation of the solvent, care being taken to avoid subjecting the polymer to too high a temperature in such operation. If a high boiling solvent is used, it is usually desirable to finish any washing of the polymer with a low boiling material, such as one of the lower aliphatic alcohols or hexane, pentane, etc. which aims at removal of the high boiling materials and permits removal of extraneous material during the final polymer drying step. Such drying step is desirably effected in a vacuum at moderate temperatures, preferably well below 100° C.

For the purpose of illustrating some of the various aspects and advantages of the invention, the following examples are given. Propylene (propene) was chosen as a representative monomer and its polymerization is illustrative of the improvement in the degree of isotaxy of polymer products which may be achieved through the use of the catalyst system of the invention. Triethylaluminum was the organo-aluminum compound employed in the examples and titanium trichloride was chosen as the representative titanium compound constituting the third component of the catalyst system. In each of the examples, dry heptane was used as the hydrocarbon diluent in which the catalyst dispersion was prepared and the polymerization carried out. It will, of course, be understood that the examples are presented in illustration of the invention, but are not to be considered as limiting the scope of the invention to the precise reaction conditions or reactants employed therein since variations from the particular catalyst components, monomers, solvents, proportions, temperatures, pressures, and the like can be made without departure from the basic principles which underlie the invention.

Examples 1–18

Materials:
  Triethylaluminum
  Titanium trichloride (aluminum activated)
  Dry heptone (distilled over calcium hydride)
  Polymerization grade propene
  Various compounds containing a sulfur atom bonded directly to a halogen atom (all commercially available)

Procedure.—Dry heptane (40 to 100 ml.) was transferred under argon gas into thick-walled beverage bottles of about 200 ml. capacity. The required amounts of the sulfur-halogen compounds were then added to the heptane diluent. The sulfur-halogen compounds, where solids, were weighed into the polymerization bottles, and where liquids, were transferred with syringes. The triethylaluminum was measured with a syringe and transferred to the polymerization bottles in a nitrogen flushed dry box. Upon mixing the trialkylaluminum with the sulfur-halogen compounds, the formation of milky suspensions was sometimes observed.

The last ingredient of the tri-component catalyst system, titanium trichloride, was next added in the nitrogen flushed dry box from pre-weighed vials. The relative amounts of heptane and titanium trichloride used were such as to give a 15 millimolar titanium compound concentration in the diluent. Similarly, a sufficient amount of triethylaluminum was used in the catalyst system to provide a triethylaluminum to titanium trichloride mole ratio of 2. An exception to this ratio was made in the case of two runs in which the mole ratio of the respective components was 4 as hereinafter more specifically indicated. Upon the addition of the titanium trichloride to the heptane diluent, pink to brown to black suspensions were formed.

The polymerization bottles were next tightly capped with neoprene septa and propene at 40 p.s.i.g. was injected into the polymerization bottles (ca. 7 grams of propene per 100 ml. of heptane). The bottles were then agitated overnight (a period of about 16 hours) at a temperature of 75° C. The bottles were next brought to room temperature and vented. Except as noted, in the data reported in Table I hereinafter, the propene was substantially all polymerized by the described procedure as evidenced by the absence of superatmospheric pressure within the polymerization bottles upon venting.

The catalyst was then de-activated by the addition of 20 ml. of isopropanol to the polymerization bottles and the mixture was slurried in a blender with 200 ml. of water and 100 ml. of additional heptane. The slurry was transferred to a separatory funnel where it was mixed well with about 25 ml. of concentrated hydrochloric acid. The clear aqueous layer resulting was discarded, and the organic layer with the suspended polymer therein was washed twice more with water. After the organic layer was diluted with 100 ml. of isopropanol, the suspended polymer was separated by filtration. The soluble polymer was recovered by concentrating the filtrate on a steam bath. The insoluble polymer was slurried in a blender with 300 ml. of isopropanol and then recollected by filtration. After drying overnight in vacuo at 50° C. to 60° C., the insoluble polymer was extracted with refluxing heptane in a vapor jacketed extractor. As will be recognized by those skilled in the art, the insoluble polymer not extracted in the refluxing heptane is considered a measure of the isotaxy of the polymer.

The results of a number of polymerization runs which were carried out in the manner hereinbefore described are set forth in Table I. With the one exception indicated, in each of the runs, 15 millimolar of titanium trichloride and 30 millimolar of triethylaluminum were introduced to the

TABLE I.—POLYMERIZATION OF PROPENE IN THE PRESENCE OF SULFUR-HALOGEN COMPOUNDS

| Example | Sulfur-Halogen Compound | Mole Ratio Sulfur-Halogen to AlEt$_3$ | Percent Polymer Insoluble in Refluxing Hexane | Inherent Viscosity | Comments |
|---|---|---|---|---|---|
| 1 | p-Toluenesulfonyl chloride* | 0.5 | 82 | 4.13 | |
| 2 | do | 1.0 | | | Very little polymer formed. |
| 3 | Trichloromethanesulfonyl chloride | 0.25 | 83 | 2.88 | |
| 4 | do | 0.5 | 91 | 3.38 | |
| 5 | Trichloromethanesulfenyl chloride | 0.19 | 79 | 4.23 | |
| 6 | do | 0.25 | 93 | 3.60 | |
| 7 | Sulfuryl chloride | 0.25 | 84 | 4.89 | |
| 8 | do | 0.5 | 91 | 5.13 | 79 percent conversion. |
| 9 | Thionyl chloride | 0.25 | 72 | 2.96 | |
| 10 | do | 0.30 | 87 | 5.29 | |
| 11 | do | 0.37 | 83 | 6.21 | |
| 12 | do | 0.5 | | | Very little polymer formed. |
| 13 | Ethyl chlorosulfate | 0.3 | 87 | 5.29 | |
| 14 | Sulfur monochloride | 0.17 | 93 | 3.60 | |
| 15 | do | 0.25 | 90 | 4.42 | |
| 16 | do | 0.38 | 91 | 5.45 | |
| 17 | do | 0.5 | | | Do. |
| 18 | None (control) | | 58 | | |

*In the p-toluenesulfonyl chloride run, 60 millimolar of triethylaluminum was used instead of 30 millimolar as in the case of the other runs.

dry heptane diluent. The polymerization was then carried out at 75° C. and propene was introduced at the beginning of each of the polymerization runs at a pressure of 40 p.s.i.g. The values of percent heptane insoluble polymer which are reported in Table I are based upon the total isolated soluble and insoluble polymer. The inherent viscosities were determined in Decalin at 135° C. at 1 gram per liter.

From the data tabulated in Table I, it is clear that the addition in the proper amount of the described sulfur-halogen compounds to the basic Ziegler-Natta catalyst system yields polypropylene having a relatively high isotactic content as evidenced by the high heptane insoluble portion of the polymer yielded. Example 18 is a control run in which no sulfur-halogen compound was added to the triethylaluminum-titanium trichloride catalyst system. It will be perceived that the percent of heptane insoluble polymer formed in this polymerization run is considerably lower than the amount of the isotactic polymer produced when the catalyst system includes the sulfur-halogen compound modifiers.

Examples 19–25

A series of polymerization runs were carried out using elemental sulfur as the third element in a catalyst system employing triethylaluminum and titanium trichloride as typical basic components of a Ziegler-Natta catalyst. The mole ratio of the elemental sulfur to triethylaluminum was varied to evaluate the effect of this variable on the overall polymer yield (reaction rate), and the total amount of isotactic polymer formed. In general, the polymerization runs were carried out in substantially the same manner as those described above with reference to Examples 1 through 18. However, the polymerizations were conducted in bottles of approximately 1 liter capacity with about 500 ml. of dry heptane being used as the hydrocarbon diluent. Moreover, the required amounts of triethylaluminum and sulfur were first mixed and then heated at about 70° C. for 3 to 4 hours to assure the thorough dispersion or solution of the sulfur. The polymerization bottles were then cooled and the titanium trichloride was added. In each of the runs, the titanium trichloride concentration in the dry heptane was between 5 and 6 millimolar, and the mole ratio of the titanium trichloride compound to the triethylaluminum was about 0.5. The propene was injected continuously into the polymerization bottles at a pressure of about 40 p.s.i.g. In the runs evaluating the catalyst systems which included elemental sulfur, however, the polymerization bottles were agitated for about 3.5 hours at a temperature of from about 70 to about 72° C. After the polymerization was completed, the bottles were vented, the catalyst de-activated with isopropanol, and the polymer was isolated in the manner described above in reference to Examples 1–18. The isotaxy of the polymer formed was measured by the insolubility of the polymer in refluxing heptane.

TABLE II.—POLYMERIZATION OF PROPENE IN THE PRESENCE OF SULFUR

| Example | Mole Ratio Sulfur to AlEt$_3$ | Percent Polymer Insoluble in Refluxing Hexane | Inherent Viscosity | Polymerization Rate* |
|---|---|---|---|---|
| 19 | 1.0 | 94 | 7.01 | |
| 20 | 0.6 | 76 | | 1.13 |
| 21 | 0.7 | 79 | | 80 |
| 22 | 0.7 | 85 | | 36 |
| 23 | 0.75 | 92 | | 18 |
| 24 | 0.9 | 95 | | 10 |
| 25 (control run) | (¹) | 58 | 2.38 | (²) |

¹ No sulfur. ² Control.
*Grams of polymer per gram TiCl$_3$ per 3.5 hours.

The data tabulated in Table II show that elemental sulfur is an effective modifier for addition to the basic Ziegler-Natta catalyst system for the purpose of increasing the isotactic content of polypropylene formed using the polymer system. The data further indicate that as the mole ratio of the sulfur to triethylaluminum becomes larger, the polymerization rate decreases, but the heptane insoluble fraction of the polymer increases.

Although certain specific examples and embodiments of this invention have been hereinbefore described, the invention is not to be considered as limited to the precise reaction conditions and reactants cited as changes and modifications may be made therein which are within the spirit and scope of the invention as defined by the appended claims.

What is claimed is:
1. A catalyst composition comprising:
   (a) titanium trichloride;
   (b) triethyl aluminum; and
   (c) sulfuryl chloride,
wherein the mole ratio of sulfuryl chloride to trialkyl aluminum varies from about 0.2 to about 1.0.

2. A catalyst composition comprising:
   (a) titanium trichloride;
   (b) triethyl aluminum; and
   (c) thionyl chloride,
wherein the mole ratio of thionyl chloride to trialkyl aluminum varies from about 0.25 to about 0.5.

3. A catalyst composition comprising:
   (a) titanium trichloride;
   (b) triethyl aluminum; and
   (c) sulfur monochloride,
wherein the mole ratio of sulfur monochloride to trialkyl aluminum varies from about 0.10 to about 0.5.

References Cited

UNITED STATES PATENTS

| 3,317,499 | 5/1967 | Nakaguchi et al. | 260—93.7 |
| 3,220,995 | 11/1965 | Stogryn | 260—93.7 |
| 3,147,239 | 9/1964 | Canterino | 260—93.7 |

JOSEPH L. SCHOFER, *Primary Examiner.*

M. B. KURTZMAN, *Assistant Examiner.*